United States Patent
Engel

(10) Patent No.: US 6,440,229 B1
(45) Date of Patent: Aug. 27, 2002

(54) LOWER PRE-HEAT BLOCK FOR USE IN METAL SCARFING APPARATUS

(75) Inventor: Stephen A. Engel, Florence, SC (US)

(73) Assignee: The Esab Group, Inc., Florence, SC (US)

( * ) Notice: Subject to any disclaimer, the term of this patent is extended or adjusted under 35 U.S.C. 154(b) by 0 days.

(21) Appl. No.: 09/620,420

(22) Filed: Jul. 20, 2000

Related U.S. Application Data

(62) Division of application No. 09/156,992, filed on Sep. 18, 1998, now Pat. No. 6,174,491.

(51) Int. Cl.⁷ .............................................. B23K 7/00
(52) U.S. Cl. ...................................... 148/194; 266/51
(58) Field of Search ................. 148/194; 266/48, 266/51

(56) References Cited

U.S. PATENT DOCUMENTS

| | | | |
|---|---|---|---|
| 2,356,197 A | 8/1944 | Jones et al. | |
| 2,838,431 A | 6/1958 | Allmang et al. | |
| 3,231,431 A | 1/1966 | Allmang | |
| 4,115,154 A | 9/1978 | Fuhrhop | |
| 4,287,005 A | 9/1981 | Engel | |
| 4,389,038 A | 6/1983 | Fuhrhop | |
| 5,234,658 A | 8/1993 | Showalter et al. | |
| 5,304,256 A | 4/1994 | Showalter et al. | |
| 5,333,841 A | 8/1994 | Showalter et al. | |
| 5,358,221 A | 10/1994 | Showalter et al. | |
| 5,472,175 A | 12/1995 | Showalter et al. | |
| 5,497,976 A | 3/1996 | Showalter et al. | |
| 5,520,370 A | 5/1996 | Boylan et al. | |
| 6,174,491 B1 * | 1/2001 | Engel | 266/51 |

FOREIGN PATENT DOCUMENTS

| | | |
|---|---|---|
| EP | 0 268 350 A1 | 5/1988 |
| LU | 52409 A | 5/1967 |

* cited by examiner

Primary Examiner—Scott Kastler
(74) Attorney, Agent, or Firm—Alston & Bird LLP

(57) ABSTRACT

A lower pre-heat block assembly (9) for use with a metal scarfing apparatus (5) is disclosed. The lower pre-heat block assembly has a lower block (38) and an extension (39) engaged upon and in overlying relationship with a front face (46) of the lower block. A gas discharge outlet (56) is defined within the front face of the block. The extension may partially overlie the gas discharge outlet such that a gas discharge orifice (70) is defined in the front face of the block by the extension. The extension includes an upper face (58) which extends forwardly from the front face of the block, and is recessed with respect to an upper face (41) of the block. So constructed, when a sheet-like oxidizing gas flow (82) is passed over the upper faces of the block and the extension, respectively, and as a fuel gas (85) is emitted through the gas discharge outlet, the fuel gas is pneumatically compressed between the oxidizing gas flow and the upper face of the extension such that the fuel gas is substantially uniformly distributed along the longitudinal length of the lower pre-heat block assembly and forms a uniform sheet-like fuel gas flow (90) which underlies and adjoins the sheet-like oxidizing gas flow so as to prevent ambient air from aspirating into the oxidizing gas flow and thereby result in a smooth and uniformly scarfed surface on the metal workpiece.

7 Claims, 6 Drawing Sheets

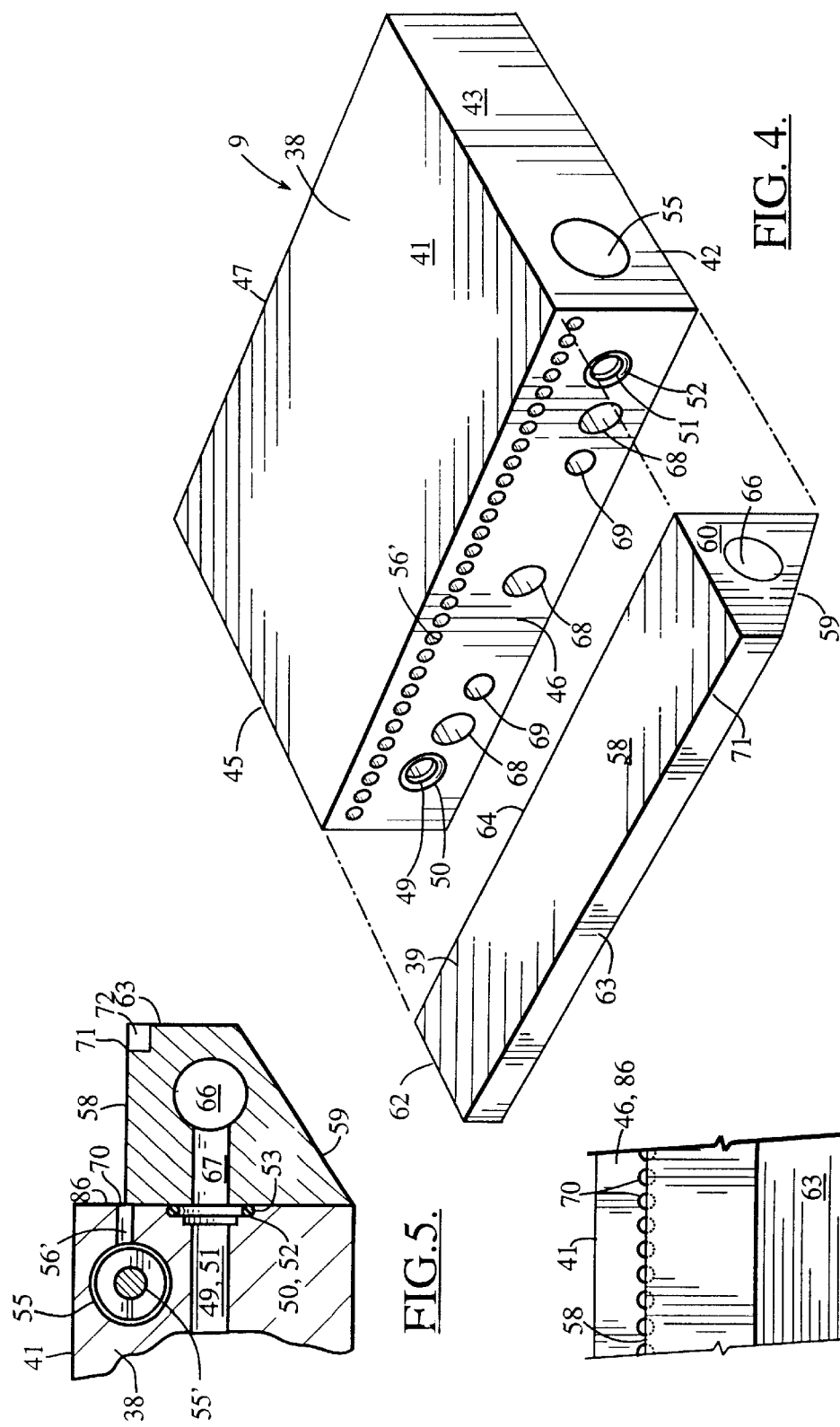

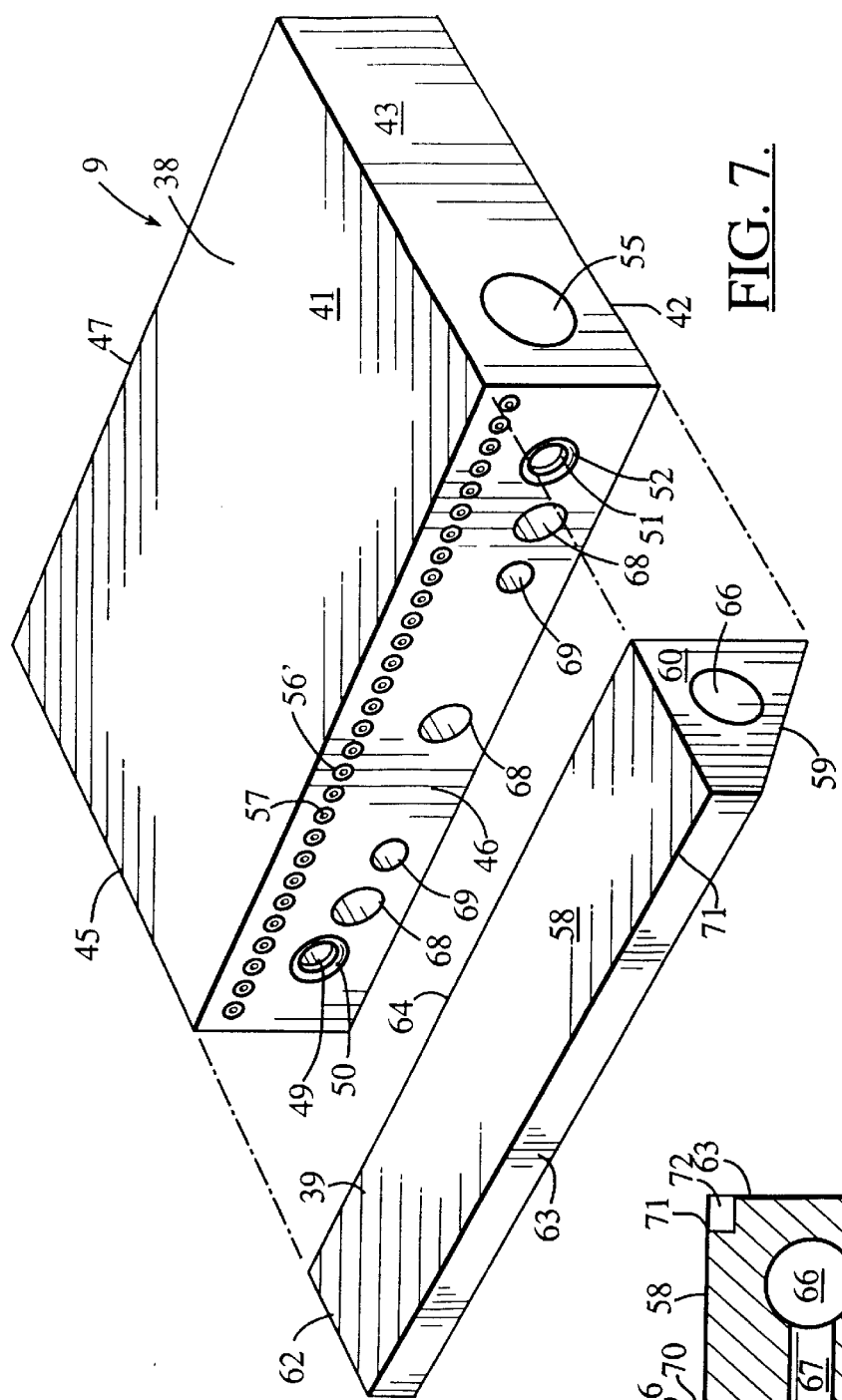
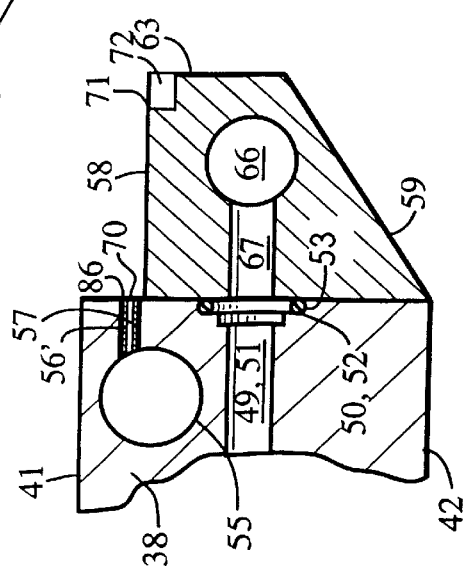

LOWER PRE-HEAT BLOCK FOR USE IN METAL SCARFING APPARATUS

CROSS REFERENCE TO RELATED APPLICATION

The present application is a division of application Ser. No. 09/156,992, filed Sep. 18, 1998, now U.S. Pat. No. 6,174,491 B1.

FIELD OF THE INVENTION

The invention relates in general to an apparatus used for the thermochemical scarfing of metal workpieces. More particularly, the invention relates to an improved lower pre-heat block assembly for use with such an apparatus in which the block assembly is constructed and arranged to create a sheet-like gas flow for shielding a separate sheet-like oxidizing gas flow generated during the scarfing process to attain a smooth scarfed surface on the metal workpieces.

BACKGROUND OF THE INVENTION

In the production and finishing of metal workpieces, for example elongate steel slabs, billets, and bar stock, the steel is conditioned or surface finished by creating relative motion between the steel workpiece and a scarfing apparatus having at least one scarfing unit positioned along the top, bottom, or side surfaces of the workpiece to eliminate surface defects such as cracks, seams, slag inclusions, surface oxides, and mechanical defects resulting from the rolling or casting process, for example. One known type of such a scarfing apparatus includes top, bottom, and opposed side scarfing units that are mounted across the width and end portions of the workpiece to concurrently scarf each of the sides of the workpiece as it is passed through the scarfing apparatus and between the scarfing units so provided.

The top, side, and bottom scarfing units of the scarfing apparatus each include a manifold and head assembly constructed and arranged to receive and distribute both oxygen and fuel gas to opposed upper and lower pre-heat blocks or block assemblies provided as a part of each such scarfing unit. The respective upper and lower pre-heat blocks are spaced from one another to define an oxygen scarfing slot therebetween, and through which a quantity of oxygen is passed under pressure and directed toward the workpiece to enable the thermochemical scarfing process to occur. The lower pre-heat block will typically include a fuel gas channel having a discharge opening positioned adjacent the oxygen slot formed by the upper and lower pre-heat blocks for discharging a fuel gas adjacent the oxygen flow for the purpose of maintaining the oxidation reaction on the surface of the workpiece, and for also shielding the oxygen flow from aspiration, i.e., from mixing with ambient air, which tends to diminish the effectiveness of the thermochemical scarfing process.

One example of such a known type of lower pre-heat block is disclosed in U.S. Pat. No. 2,838,431 to Allmang et al., in which the pre-heat block is disclosed as being of one piece construction and includes a spaced series of fuel gas outlets extending across the width of the front face of the block. The fuel gas is delivered to the inlet ports through a number of laterally spaced fuel gas lines which extend from a rear face of the block to a transverse internal bore positioned just behind, and in communication with the inner ends of the outlet ports. An elongate dividing rod, or bar, comprising a number of spaced transverse discs is positioned within the bore so as to divide the bore into a series of uniform gas distribution chambers. The ends of the bore are closed with end seals in known fashion.

Although the fuel gas outlet ports defined in the front face of the lower pre-heat block of Allmang, et al. were an improvement over the then-known scarfing machines, in that the fuel gas ports were closely spaced with respect to one another in the effort to prevent outside air from aspirating with the oxidizing gas stream, the problem still remained that outside air would tend to be drawn toward and between the fuel gas outlet ports such that outside air would aspirate with the oxidizing gas flow.

As known to those of skill in the art, the shielding of the sheet-like oxygen stream, or oxidizing gas flow created when oxygen is passed between the upper and lower pre-heat blocks is most critical in producing a smooth scarfed surface on the workpiece being scarfed as any variation or inconsistency in the lower pre-heat block fuel gas flame can cause a variation in the scarfed surface. Any such variation can lead to non-uniform metal removal, with ridges and valleys being the result, such that the scarfing depth must be increased in order that these ridges or valleys be removed, i.e., a sufficient quantity of the surface of the object must be removed to provide for the removal of all such surface defects which pre-existed the scarfing process, as well as those which may have been caused by the scarfing process. As a result, the scarfing apparatus of Allmang, et al. and others similarly constructed, led to the removal of excess metal, causing otherwise satisfactory metal to be removed which increases yield loss rates during the workpiece finishing process.

The scarfing apparatus of Allmang et al. was improved upon in U.S. Pat. No. 3,231,431 to Allmang by adding an elongate baffle strip of an approximate one-half (½) inch length positioned approximately one-quarter (¼) inch below the oxygen slot to prevent the aspiration of ambient air into the oxygen stream, as disclosed in Column 2, Lines 34–72, and Column 3, Lines 1–13 thereof. As stated in Column 2, Lines 61–65 of Allmang, it was believed that a confining action caused by the baffle strips on both sides of the oxygen-fuel mixture prevented atmospheric air from aspirating with the oxygen at a point adjacent to each row of pre-heat (gas outlet) ports.

Although the patent to Allmang represented an improvement in the art, the need still existed for an improved scarfing apparatus which would more consistently produce a smooth surfaced scarfed metal workpiece. It was to the attainment of this object that the lower pre-heat block assembly of Showalter, et al. disclosed in U.S. Pat. No. 5,497,976 was developed. Showalter attained a smooth surface scarf by providing a lower pre-heat block assembly for use in a thermochemical scarfing apparatus which included an improved fuel gas delivery system for delivering a stream of fuel gas uniformly across the full width of the metal workpiece, and which shielded the oxidizing gas flow to ensure that the peaks and valleys resulting from the use of the earlier known scarfing devices were minimized. This was accomplished by providing a two-piece lower pre-heat block assembly having a base member or block, and an extension releasedly fastened thereto in engaging and overlying relationship on the front face of the block. An elongate gas discharge slot was machined into the extension, which slot communicated with a spaced series of gas discharge ports defined within and extending longitudinally across the front face of the block. The extension also included internal baffles for inducing turbulence in the fuel gas flow to ensure complete mixing of the fuel gas, such that the fuel gas would be emitted through the gas discharge slot as a uniform flow across the face of the extension.

The lower pre-heat block assembly of Showalter et al. represented a significant advance in the art, but it required that a two-piece lower pre-heat block assembly be manufactured in which a precisely machined slot is required within the extension, and which also required the use of internal baffles for inducing turbulence in the fuel gas flow to ensure that the fuel gas is distributed uniformly across the width of the extension in order to prevent ambient air from aspirating with the oxidizing/oxygen gas flow as it is passed between the upper and lower pre-heat block assemblies, and directed toward the metal object or workpiece to be thermochemically scarfed.

What is needed, therefore, but seemingly unavailable in the art is an improved lower pre-heat block assembly for use with a thermochemical scarfing apparatus which is simple in design and manufacture, and which will ensure that a sheet-like fuel gas flow is produced for shielding the oxidizing gas flow.

In the lower pre-heat block assembly of Showalter et al., the disclosed gas discharge slot is provided within an otherwise conventional extension having a baffle similar to that disclosed in U.S. Pat. No. 3,231,431 to Allmang, such that should the fuel gas discharge slot became plugged or obstructed at any point along its length, the probability exists that ambient air will be allowed to aspirate with the oxidizing gas flow, which may lead to the formation of peaks and valleys during the metal scarfing process. What is needed, therefore, is an improved lower pre-heat block assembly for use with a scarfing apparatus in which a gas discharge outlet which is less likely to become obstructed is defined within the modular base or block, and with which the extension can be placed in engaging and overlying position such that it defines a gas discharge orifice of a desired size in the face of the block for simplifying the manufacture of the lower pre-heat block assembly, and for allowing the fuel gas to be distributed evenly across the width of the lower block assembly so that the lower block will perform satisfactorily even if there may be plugs or obstructions in the gas discharge outlets to shield the oxidizing gas flow from ambient air during the scarfing process.

Lastly, although the baffle of the patent to Allmang proved useful in minimizing the aspiration of ambient air within the oxidizing gas flow, this problem still persists, even with the improved lower pre-heat block assembly of Showalter et al. Accordingly, what is needed is an improved lower pre-heat block assembly for use with a thermochemical scarfing apparatus which is constructed to utilize the oxidizing gas flow as it is passed over the lower pre-heat block assembly to pneumatically compress, or squeeze, the fuel gas between the oxidizing gas flow and the lower pre-heat block assembly such that the fuel gas is uniformly distributed across the width of the lower pre-heat block assembly, and for forming a sheet-like fuel gas flow which shields and adjoins the oxidizing gas flow as it is continues on toward the metal workpiece to be scarfed so as to minimize the likelihood that peaks and valleys will be formed during the scarfing process, and to improve production yields during the metal finishing process.

SUMMARY OF THE INVENTION

The present invention provides an improved lower pre-heat block assembly for use with a thermochemical scarfing machine which overcomes some of the design deficiencies of the other lower pre-heat block assemblies known in the art. The lower pre-heat block assembly of this invention provides a simple, efficient, and highly flexible apparatus for uniformly distributing a fuel gas across the width of a lower pre-heat block assembly, and for forming the fuel gas into a sheet-like fuel gas flow which adjoins and shields an oxidizing gas flow passed over the lower pre-heat block assembly and along a flow path leading toward a metal object, or workpiece, to be thermochemically scarfed during the steel finishing process. The relative simplicity of this improved lower block assembly in comparison with the known lower block assemblies allows for a greater degree of reliability in shielding the oxidizing gas flow, and in maintaining its sheet-like flow characteristics along the flow path to minimize the formation of peaks and valleys in the surface of the metal workpieces being thermochemically scarfed with the scarfing apparatus.

The term "sheet-like" as used herein means a flow which is in the form of a sheet.

This invention attains this high degree of flexibility, maintainability, reliability, as well as simplicity in design and operation, by providing a lower pre-heat block assembly for use with the thermochemical scarfing apparatus comprising a modular block having opposed upper and lower faces, opposed end faces, and opposed front and rear faces extending between the end of faces in a longitudinal direction. A gas discharge outlet is defined within, and extends longitudinally across the front face of the block. A modular extension is engaged on, and partially overlies the front face of the block. The extension may partially overlie the gas discharge outlet to define a gas discharge orifice in communication with the gas discharge outlet on the front face of the block, as desired. The extension is constructed and arranged to be releasably secured to the front face of the block. A feature of this construction is that the lower pre-heat block assembly of this invention does not therefore require the fabrication of a precisely machined fuel gas discharge slot or orifice therein and is less susceptible to dirt or other obstructions fouling the gas discharge outlet, which may in turn prevent the distribution of the fuel gas uniformly across the lower block assembly. This therefore minimizes the likelihood of disruptions in the oxidizing gas flow, and allows for a lower pre-heat block assembly which is simple to manufacture, and provides greater production efficiencies when in use.

The extension has a separate upper face and an opposed lower face, opposed end faces, and opposed front and rear faces extending between the end faces in a longitudinal direction. The rear face of the extension is placed in an overlying relationship on the front face of the block. The upper face of the extension is recessed with respect to, i.e. it is positioned below, the level of the upper face of the block such that the extension is stepped down a pre-determined height from the upper face of the block. The extension further comprises a leading edge spaced from the front face of the block which extends longitudinally along the length of the extension. The leading edge of the extension may be recessed with respect to the front face of the extension for forming a notch to protect, or shield, the leading edge with the front face of the extension.

The lower pre-heat block assembly of this invention is intended for use in a conventional thermochemical scarfing apparatus in which an upper pre-heat block assembly is provided, the lower pre-heat block assembly being spaced from and opposed to the upper block assembly such that an oxygen slot is defined by and between the two block assemblies, and through which oxygen is passed and formed into an oxidizing gas flow moving along a flow path extending toward the metal workpiece to be scarfed. In fashion heretofore unknown in the art, the unique construction of the lower pre-heat block assembly of this invention makes use of the expansion of the oxidizing gas flow to "pneumatically" compress or squeeze the fuel gas between the oxidizing gas flow, the front face of the modular block, and the second upper face provided on the extension along the longitudinal length of the lower pre-heat block assembly, i.e., across the width of the workpiece being scarfed, to ensure that the fuel gas is uniformly distributed along substantially the full longitudinal extent of the front face of the lower pre-heat block assembly, and to pass the compressed and now distributed fuel gas as a substantially uniform and sheet-like gas flow through a pneumatic slot formed by and between the oxidizing gas flow and the leading edge of the extension to ensure that the sheet-like fuel gas flow underlies and adjoins the sheet-like oxidizing gas flow as they then both flow together along the flow path toward the metal workpiece to be scarfed. The unique construction of this lower pre-heat block assembly thus provides for the uniform distribution of fuel gas across the width of the oxidizing gas flow to greatly minimize the likelihood of ambient air aspirating with the oxidizing gas flow, and is constructed to keep a smooth sheet-like oxidizing gas flow moving toward the workpiece so that a more smoothly scarfed surface of the workpiece results, thus resulting in greater production yields and manufacturing efficiencies than the known scarfing devices.

The improved lower pre-heat block assembly of this invention, therefore, also results in a new method of shielding the oxidizing gas flow of a thermochemical scarfing machine during use, which method comprises the steps of passing the sheet-like oxidizing gas flow over the upper surface of the modular base or block of the lower pre-heat block assembly; discharging a fuel gas from a fuel gas discharge outlet defined in the front face of the block adjoining a first upper face thereof so as to form a sheet-like fuel gas flow which underlies the oxidizing gas flow; compressing the sheet-like fuel gas flow between the front face and a second upper face formed on the extension of the lower pre-heat block assembly with the oxidizing gas flow so that the sheet-like fuel gas flow is substantially and uniformly distributed under the sheet-like oxidizing gas flow, whereupon both of the sheet-like gas flows pass together along the flow path toward the workpiece to be scarfed, the sheet-like gas flow shielding the sheet-like oxidizing gas flow from ambient air to permit the scarfing of a smooth surface on the metal workpiece without the peaks and valleys caused by ambient air being allowed to aspirate with the oxidizing gas flow.

The step of forming the fuel gas into the sheet-like fuel gas flow also includes the step of pneumatically squeezing the fuel gas against the front face of the block, the upper face of the extension, and the oxidizing gas flow, and passing the fuel gas through a pneumatic slot defined by the oxidizing gas flow and a leading edge extending the longitudinal length of the upper face of the extension to form the fuel gas into the sheet-like fuel gas flow adjoining the oxidizing gas flow.

It is, therefore, an object of the present invention to provide an improved lower pre-heat block assembly for use in a metal scarfing apparatus which will reliably and consistently produce a smooth scarfed surface on a metal workpiece being thermochemically scarfed therewith.

It is another object of the present invention to provide an improved lower pre-heat block assembly for use in a metal scarfing apparatus which is simple in design and construction, is rugged and durable in use, and is easy to use and maintain.

Yet another object of the present invention is to provide an improved lower pre-heat block assembly for use in a metal scarfing apparatus which will minimize the likelihood of ambient air aspirating with the oxidizing gas flow, and for forming a sheet-like fuel gas flow adjoining the oxidizing gas flow to shield the oxidizing gas flow during the thermochemical scarfing process.

It is to these objects, as well as the other objects, features, and advantages of the present invention, which will become apparent upon reading the specification, when taken in conjunction with the accompanying drawings, to which the invention is directed.

BRIEF DESCRIPTION OF THE DRAWINGS

FIG. 4 is an exploded perspective view of a second embodiment of the lower pre-heat block of the invention.

FIG. 5 is a partial cross-sectioned side elevational view of the lower pre-heat block of FIG. 4, in which a notch is defined along the leading edge of the extension thereof.

FIG. 6 is a partial front elevational view of the pre-heat block of FIG. 4.

FIG. 7 is an exploded perspective view of a third embodiment of the lower pre-heat block of the invention.

FIG. 8 is a partial cross-sectioned side elevational view of the lower pre-heat block of FIG. 7, in which a notch is defined in the leading edge of the extension thereof.

DETAILED DESCRIPTION OF THE PREFERRED EMBODIMENTS

Figure 1:
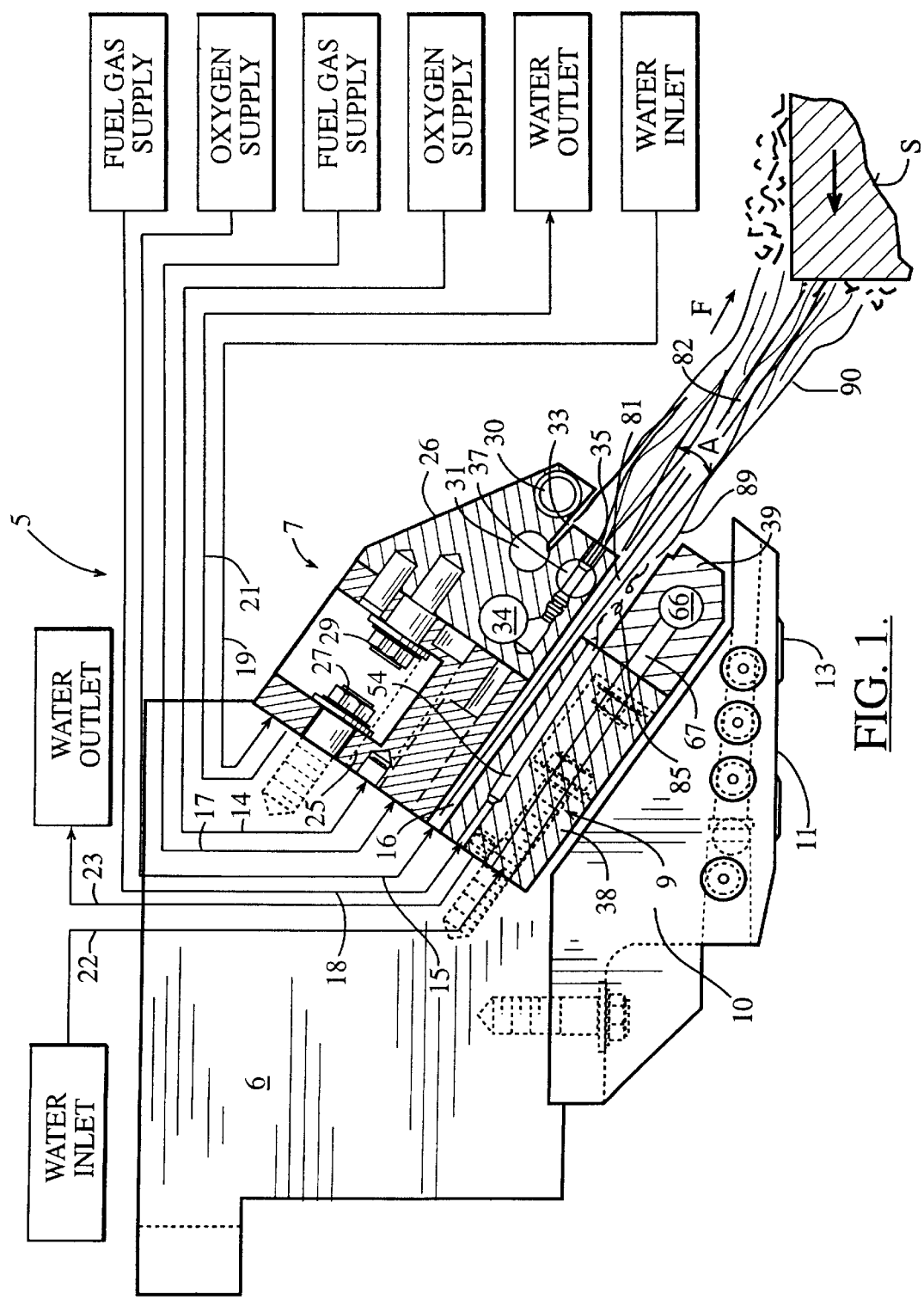
FIG. 1 is a partially sectioned, schematic side elevational view of a scarfing apparatus in which the improved lower pre-heat block of the present invention is positioned for pre-heating a steel slab before the commencement of a thermochemical scarfing operation.

Referring now in detail to the drawings, in which like reference characters indicate like parts throughout the several views, a thermochemical scarfing apparatus 5 is illustrated in FIG. 1. Scarfing apparatus 5 includes a manifold and head assembly 6 constructed in known fashion, the manifold and head assembly being constructed and arranged to receive and mount an upper pre-heat block assembly 7, and a spaced, opposed lower pre-heat block assembly 9. The scarfing apparatus also includes, in known fashion, a riding shoe 10 fastened to the manifold and head assembly, the riding show having a lower surface 11 on which at least one skid 13 is formed. The riding shoe and skids are provided such that as a metal workpiece, for example a steel stab, denoted by reference character "S" in FIG. 1, is advanced along a path of travel past the scarfing apparatus, the manifold and head assembly can be moved into position such that the skids 13 of the riding shoe engage and ride upon a respective one of the upper, lower, or side surfaces of the steel slab, respectively, each of which will be provided with a separate scarfing apparatus constructed in a fashion similar, if not identical, to the construction of scarfing apparatus 5 of FIG. 1. Scarfing apparatus 5 as shown in FIG. 1 is an upper scarfing apparatus with respect to the steel slab as it is advanced along the path of travel thereby. The construction of scarfing apparatus 5, and more particularly the construction of manifold and head assembly 6 is described in greater detail in U.S. Pat. No. 5,234,658 issued to Showalter et al., the provisions of which are incorporated herein by this reference.

So constructed, manifold and head assembly 6 includes a first oxygen line 14 through which pressurized oxygen, used as the oxidizing gas in the thermochemical scarfing operation, supplied from an oxygen supply source schematically illustrated in FIG. 1, is passed to upper pre-heat block assembly 7. A second oxygen supply line 15 supplies oxygen to an oxygen slot 16 formed by and between the two upper and lower pre-heat block assemblies, respectively, such that the oxygen is formed into a sheet-like oxidizing gas flow 82 (FIGS. 1 and 11) as it is passed between the two pre-heat block assemblies, and extends along a flow path, as noted by reference character "F" in FIG. 1, leading toward the steel slab or other metal workpiece to be scarfed. The manifold and head assembly also includes a water supply line 19, which is supplied with water from a schematically illustrated water supply source, to upper pre-heat block assembly 7, and a water return line 21 such that cooling water may be circulated through the upper pre-heat block assembly in known fashion. In similar fashion, manifold and head assembly 6 also includes a second water supply line 22 which provides cooling water to the lower pre-heat block assembly 9, with a second water return line 23 such that the cooling water may be circulated through the lower pre-heat block assembly in known fashion.

The upper pre-heat block assembly 7 is best illustrated in FIG. 1, and is shown to have a modular base member or upper block 25, with an upper extension 26 engaged thereon in overlying relationship. Block 25 is secured to a mounting face (not illustrated) defined on the manifold and head assembly by a suitable fastener 27, whereas upper extension 26 is fastened to upper block 25 by a suitable fastener 29. Fasteners 27 and 29 may comprise, for example, threaded bolts, or machine screws.

An internal water passageway 30 is defined within upper extension 26, in known fashion, in communication with water supply line 19, and water discharge line 21 such that cooling water can be circulated therethrough. A first internal oxygen passageway 31, or manifold, is defined within the upper extension, and extends in the longitudinal or length-wise direction of the upper extension for supplying oxygen to an oxygen discharge outlet 33, or discharge orifice, defined within upper extension 26. Although only one oxygen discharge outlet 33 is shown in FIG. 1, it is anticipated that a spaced series of such discharge outlets will be defined along the length of the upper extension in fashion described in greater detail in U.S. Pat. Nos. 5,358.221 and 5,472,175 to Showalter et al., the provisions of each such patent being included herein by this reference. Oxygen passageway 31 is in communication with oxygen supply line 14.

Still referring to FIG. 1, upper extension 26 includes a second oxygen passageway 34, or manifold, defined therein and extending longitudinally along the length of the extension with respect to the width of the steel slab advancing along the path of travel toward, and past, the scarfing apparatus such that in this instance, the steel slab is scarfed across its entire upper surface by scarfing apparatus 5. Oxygen passageway 34 is also in communication with oxygen supply line 14, and is positioned at the distal end of a fuel gas/oxygen nozzle assembly 35 positioned within, and provided as a part of upper extension 26. Nozzle assembly 35 is described in greater detail in the two aforementioned patents to Showalter, et al., as well as in U.S. Pat. No. 5,333,841, to Showalter et al., the provisions of which are also incorporated herein by this reference. Accordingly, upper extension 26 thus includes an internal fuel gas passageway 37, or manifold, extending longitudinally along the length of the upper extension, and being in communication with nozzle assembly 35 intermediate its proximal and distal ends. The proximal end of nozzle 35 is positioned flush with the front face of upper extension 26, such that a central oxygen, or oxidizing gas flow is emitted therefrom with a surrounding fuel gas flow for shielding the oxidizing gas flow.

Upper block 25 and upper extension 26 will each be fashioned from a suitable and durable metallic material, such as a bronze or copper material, and more preferably of copper.

Figure 2:
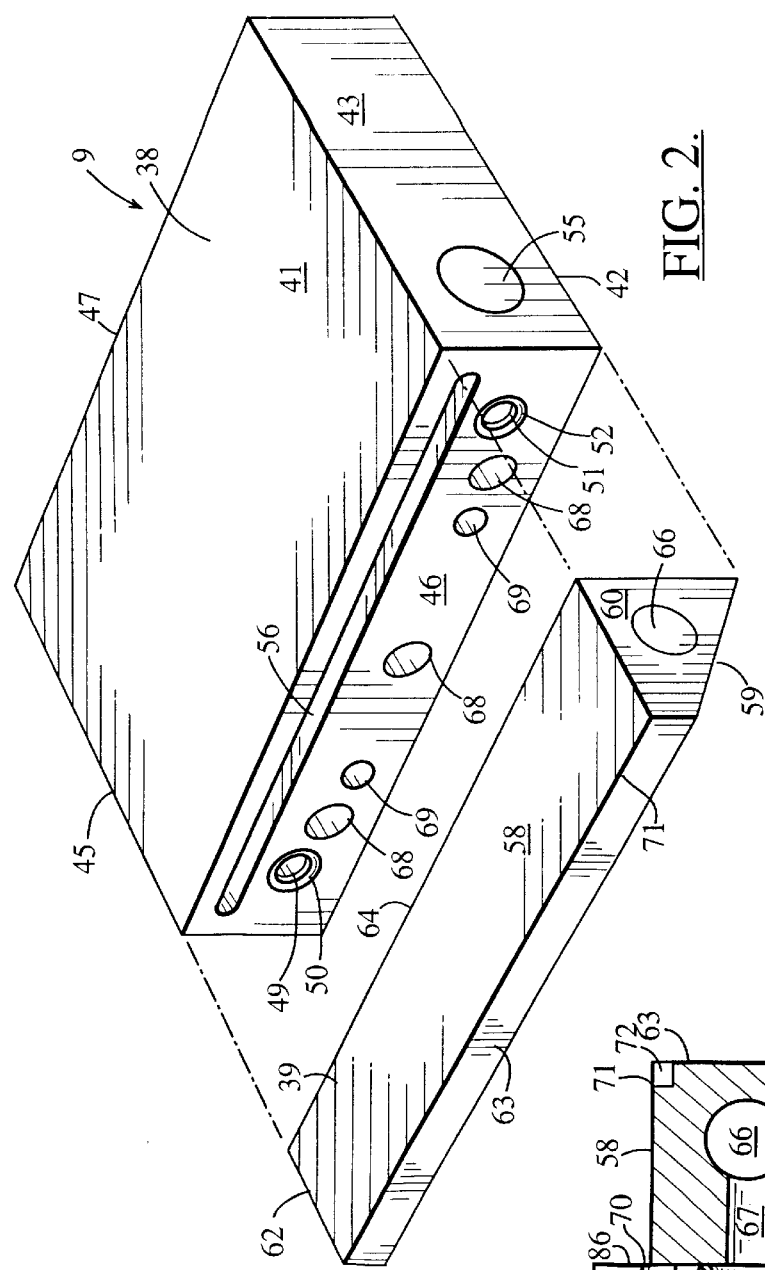
FIG. 2 is an exploded front perspective view of a first embodiment of the lower pre-heat block of the invention.
Figure 3:
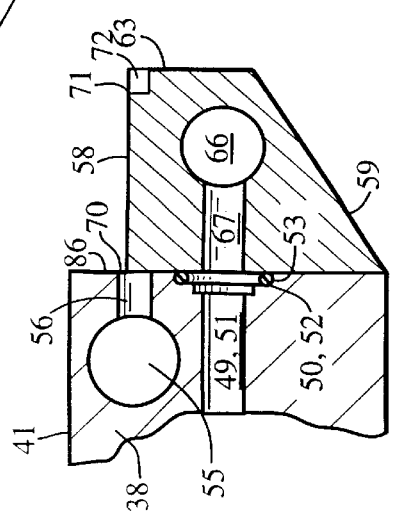
FIG. 3 is a partial cross-sectioned side elevational view of the embodiment of the lower pre-heat block of FIG. 2, in which a notch is defined along the leading edge of the extension thereof.
Figure 9:
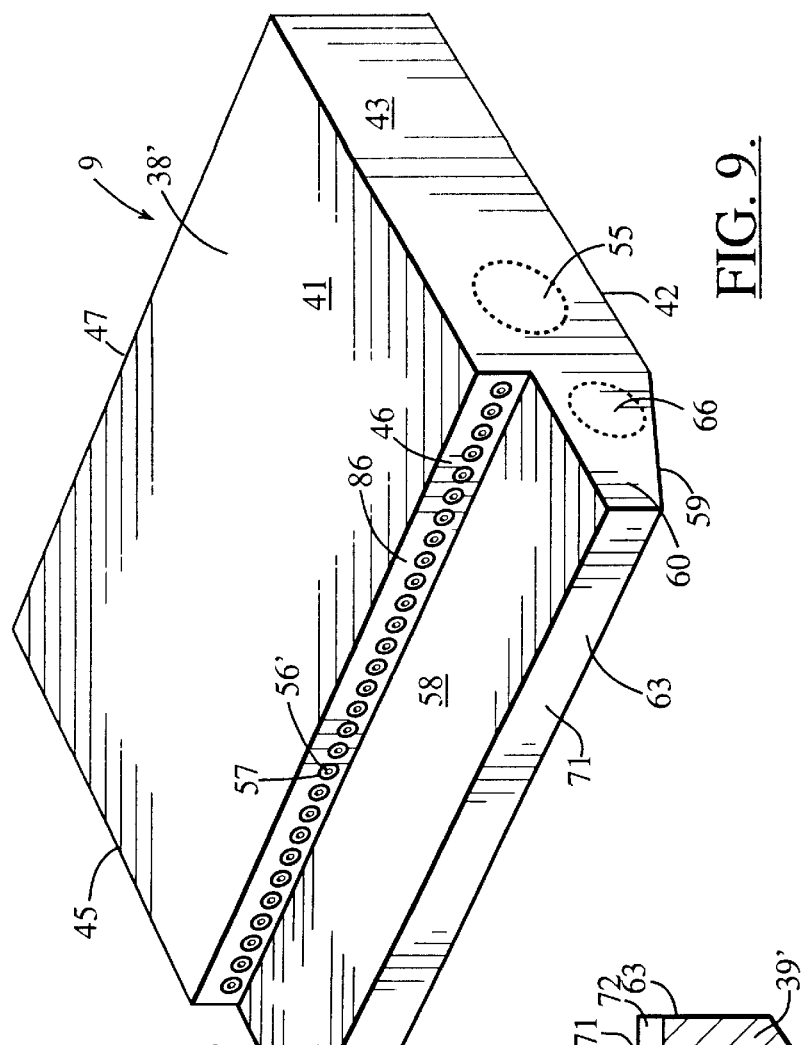
FIG. 9 is a perspective view of a fourth embodiment of the lower pre-heat block of the invention, in which the block is manufactured as a one-piece unit.
Figure 10:
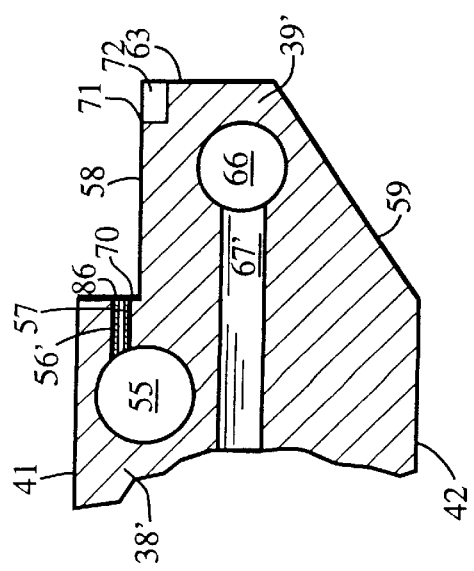
FIG. 10 is a partial cross-sectioned side elevational view of the lower pre-heat block of FIG. 9.

A first embodiment of lower pre-heat block assembly 9 is illustrated in FIGS. 1–3, in which the lower pre-heat block assembly comprises a lower modular base member or lower block 38, and a modular lower extension 39 which is engaged upon, and at least partially overlies lower block 38. Lower block 38 is releasably secured to manifold and head assembly 6 by a suitable fastener or fasteners (not illustrated), and lower extension 39 may be releasably secured to lower block 38 if so desired (FIGS. 2–5) or, in the alternative the lower extension may be formed as a part of the lower block such that lower block and extension comprise a single metallic block as shown in FIGS. 9 and 10. Lower block 38 and lower extension 39 are each fashioned of a suitable and durable metallic material, for example copper or bronze, and preferably of copper.

Referring now to FIGS. 2 and 3, a first two-piece embodiment of lower pre-heat block assembly 9 is illustrated. Lower block 38 includes a planar upper face 41, an opposed lower face 42, opposed end faces 43 and 45, which adjoin the upper and lower faces along their common edges, with a front face 46 and an opposed rear face 47 extending longitudinally in a length-wise direction of the lower pre-heat block 38 between end faces 43 and 45. A water infeed passageway 49 is defined within block 38, and extends from rear face 47 toward and through front face 46. Water infeed passageway 49 will be in communication with water supply line 22 illustrated in FIG. 1. In known fashion, and as disclosed in U.S. Pat. No. 5,497,976, to Showalter, et al., the provisions of which are incorporated herein by this reference, a concentric annular groove 50 lies about the opening of water infeed passageway 49, defined in front face 46 of the lower pre-heat block, for a receiving a suitable 0-ring 53 (FIG. 3) for the purpose of sealing the water infeed passageway on extension 39. A water return passageway 51 is also defined within lower block 38, and extends from the front face 46 toward and through rear face 47, and is in communication with water discharge line 23 of FIG. 1. As with the water infeed passageway 49 defined in the lower block, an annular groove 52 circumscribes the opening formed in front face 46 by water return passageway 51 for receiving an O-ring 53 (FIG. 3) therein to seal the passageway 39 between the block and the extension.

As best shown in FIG. 1, and as disclosed in greater detail in U.S. Pat. No. 5,497,976 to Showalter et al., a spaced series of gas supply ducts 54, only one of which is shown in FIG. 1, extend from the rear face 47 toward, and in communication with a bore 55 which serves as a gas manifold, defined longitudinally within lower block 38. Each of the respective ones of gas supply ducts 54 is in communication with fuel gas supply line 18 illustrated in FIG. 1, or its suitable equivalent. Although not illustrated in detail, an elongate rod 55' with a series of transverse annular disks spaced along its length is passed within the bore for forming a suitable number of fuel gas supply chambers within the bore such that the fuel gas will be turbulently mixed and passed as a substantially uniform flow through a gas discharge outlet 56. The construction of such an elongate rod and spacer disk device is described in U.S. Pat. No. 2,838,431 to Allmang, the provisions of which are incorporated herein by this reference. Referring now to FIG. 2, the gas discharge outlet here is defined as an elongate slot-like gas discharge outlet 56 extending longitudinally within the front face 46 of lower pre-heat block 38, and which extends inwardly of the block such that it is communication with bore 55 for being supplied with fuel gas therefrom.

Lower pre-heat block assembly 9 of FIG. 2 also includes a separate lower extension 39 which is constructed and arranged to be releasably secured to the front face of the lower block in engaging and partially overlying relationship. Lower extension 39 has a generally planar upper face 58 with an opposed lower face 59, a pair of spaced end faces 60 and 62 adjoining the upper and lower faces of the extension along their common edges, with a front face 63 and an opposed rear face 64 extending in the longitudinal lengthwise direction of the extension, and joined to the upper, lower, and end faces thereof along their common edges. As best shown in FIGS. 1 and 3, an elongate bore or water passageway 66 is defined within the extension along its longitudinal direction, and is in communication with a water supply duct 67 at each of its ends, there being two such spaced water supply ducts defined within the extension, one each of the water supply ducts being in communication with either of water infeed passageway 49, or water discharge passageway 51, respectively, defined within lower block 38.

In the two-piece configuration of lower block assembly 9 shown in FIGS. 1–8 and 11, lower extension 39 is fastened to lower block 38 by passing a threaded fastener (not illustrated) through one of three spaced openings (not illustrated) defined in the rear face 47 of the lower block and extending longitudinally therethrough and through one of the three spaced openings 68 defined in front face 46 thereof, and into a respective one of three spaced threaded openings (not illustrated) defined within the rear face 63 of the lower extension, in known fashion, such that the lower extension is releasably secured to the front face of the lower block. Lower extension 39 also includes, in known fashion, at least one, and in this instance two, dowel pins (not illustrated) spaced from one another, each of which extends laterally away from the rear face 64 of the extension and is sized and shaped to be received within a respective one of the bores 69 defined within the front face of the lower block, for guiding and aligning the lower extension on the lower block.

As shown in FIGS. 1 and 3, and in fashion heretofore unknown in the art, in its two-piece configuration the block 38 and extension 39 are constructed such that as the extension is releasably secured to the block, the upper face 58 thereof will intersect the gas discharge outlet 56 defined within the front face of the block such that the extension will define a gas discharge orifice 70 in communication with gas discharge outlet 56. An advantage of this construction is that gas discharge outlet 56, here a slot, can be milled of a larger size with greater ease, and at lower cost, during fabrication of the block, rather than milling a precise slot such as that shown in the extension of the lower pre-heat block assembly of Showalter et al., U.S. Pat. No. 5,497,976.

As known to those skilled in the art, a fuel gas is emitted through the lower pre-heat block assembly 9 for the purpose of shielding the sheet-like oxidizing gas flow 82 (FIGS. 1, 11) which is generated by passing oxygen through the slot 16 defined by and between the upper and lower pre-heat block assemblies. If ambient air is allowed to aspirate, i.e. mix with and create turbulence within the oxidizing gas flow, the likelihood of undesirable peaks and valleys being scarfed in the surface of the metal workpiece occurs, such that a greater quantity of the exterior surface of the metal workpiece must be scarfed to attain a smooth scarfed surface, which has the undesirable effect of lowering production yields. In the scarfing apparatus of U.S. Pat. No. 5,497,976 to Showalter et al, the lower pre-heat block assembly is constructed and arranged such that a 20 substantially uniform flow of the fuel gas along the longitudinal length, i.e. width of the object to be scarfed, is attained for shielding the oxidizing gas flow, and for minimizing the prospect of peaks and valleys being formed in the surface thereof to attain a smooth scarfed surface.

This requires, however, the precise machining of the slot within the extension of the lower pre-heat block assembly of Showalter et al., as well as the machining of internal baffles within the extension, and/or the lower block of the pre-heat block assembly to ensure turbulent mixing of the fuel gas, such that the fuel gas flow is uniformly distributed along the length of the extension for shielding the oxidizing gas flow from ambient air. If any openings are allowed to occur within the shielding fuel gas, for example should a portion of the slot become obscured or otherwise blocked, the likelihood of there being "breaks" in the shield which allow ambient air to aspirate with the oxidizing gas flow increases. Although this device of Showalter et al., has proven to be a significant improvement in the art, the invention disclosed herein eliminates the need precisely machine a slot within the. extension, rather a larger slot is machined or otherwise formed within the front face of the lower block 38, and extension 39 is used to define an orifice in the front face of the block such that the pre-heat block assembly should be easier to manufacture, and should be easier to maintain should the extension become damaged during scarfing operation, for example should molten metal strike and otherwise damage the extension, whereupon the extension can be quickly and easily replaced at minimal cost, rather than replacing a precision machined extension.

As shown in FIG. 3, the rear face 64 of extension 39 is engaged on the front face 46 of lower pre-heat block 38 such that the respective water supply ducts at 67 are in alignment with the respective ones of the water passageways 49 and 51 defined within the lower pre-heat block, and so that the O-rings 53 positioned within their respective grooves 51, 52 are compressed for sealing the water supply ducts on the rear face of the extension. As this occurs, and as described above, the upper face 58 of the extension forms the gas discharge orifice 70 of the lower pre-heat block 38.

In FIG. 2, a leading edge 71 is illustrated which extends along the length of lower extension 39 where upper face 58 and front face 63 join one another. However, as lower pre-heat block assembly 9 will be positioned closer to the metal workpiece to be scarfed than will be the upper pre-heat block assembly, it is desirable to protect the leading edge of the extension, for purposes which will be described in greater detail below. Accordingly, and as shown in FIG. 3, an elongate notch 72 extending the length of lower extension 39 may be defined therewithin for the purpose of recessing the leading edge 71 with respect to the front face 63 of the extension so that the front face of the extension is used to shield or protect the leading edge from damage. Again, and as described above, a feature of the two-piece construction of lower pre-heat block assembly 9 is that should extension 39 become damaged during the scarfing process, it can be quickly and easily removed and replaced on lower block 38.

A second embodiment of lower pre-heat block assembly 9 is illustrated in FIGS. 4 through 6. Lower pre-heat block 38 of FIG. 4 is constructed in fashion identical to lower pre-heat block 38 of FIG. 2, with the exception that rather than providing an elongate continuous slot as gas discharge outlet 56 (FIG. 1), a spaced and aligned series of circular openings 56' are defined within the front face of lower pre-heat block 38, as gas discharge outlets, each of which extends inwardly of the block and into communication with bore 55, also defined therein. Lower extension 39 of FIG. 4 is constructed in fashion identical to lower extension 39 of FIG. 2, and thus is not described in greater detail.

As with the embodiment of lower pre-heat block assembly 9 illustrated in FIGS. 2 and 3, the lower pre-heat block assembly of FIGS. 4 through 6 is a two-piece assembly in which extension 39 is releaseably secured to, and partially overlies the front face of the lower block 38. Referring to FIG. 5, therefore, extension 39 in this second embodiment of the lower pre-heat block assembly defines a gas discharge orifice 70, or in this instance a spaced series of gas discharge orifices 70 (FIG. 6) extending longitudinally across the front face 46 of the lower pre-heat block. Again, a feature of this construction is that it is relatively simple and quick to drill a one-eighth inch hole, for example, within the front face of lower block 38, and then size the gas discharge orifices 70, as desired, based upon the length of rear face of 64 of extension 39 overlying the front face 46 of block 38.

As shown in FIG. 6, therefore, the result of extension 39 being engaged upon and partially overlying the front face and gas discharge outlets 56' is that a spaced series of semi-circular openings are defined by the extension, each of which serves as a gas discharge orifice 70. Also, and as shown in FIG. 5, an elongate notch 72 may be defined within, and extending along the length of the leading edge 71 of the upper face of the extension such that the leading edge, and the upper face, respectively, are shielded by front face 63 of the assembly during the scarfing process.

A third embodiment of lower pre-heat block assembly 9 is illustrated in FIGS. 7 and 8. Once again, lower block 38 is constructed in fashion identical to lower blocks 38 of FIGS. 2 and 4, with the exception that each one of the circular openings 56' defined in front face 46 of lower block 38 includes an insert 57, preferably a machined copper insert, fashioned to be fit as a sleeve within the respective ones of the circular openings 56', and having an internal passageway defined therein as gas discharge orifice 70, and extending therethrough in communication with bore 55 defined in lower block 38. In this embodiment of the lower pre-heat block assembly, however, it is shown in FIG. 8 that although extension 39 is releasably secured to the lower block 38, the extension here does not partially overlie and define a gas discharge orifice within the front face of the lower block, rather the gas discharge orifice 70 is defined by the central passageway or bore defined within and extending through each one of inserts 57.

It is a feature of the construction of lower pre-heat block assembly 9 of FIGS. 7 and 8, therefore, that the circular openings 56' defined within the front face of the lower block can be oversized with respect to those machined within the lower block 38 of FIG. 4, such openings being relatively quick and easy to form, whereupon an insert having a precisely drilled passageway, for example a passage being one-tenth of an inch or nine-hundredths of a inch in diameter and extending therethrough, is provided for emitting the fuel gas therethrough during the scarfing process. However, and if so desired, it is anticipated that lower extension 39 could partially overlie the inserts 57 and could form the gas discharge orifice 70 defined by the drilled holes within each respective one of the inserts.

As shown in FIG. 8, the lower extension 39 has a leading edge 71 extending along its length where upper face 58 and front face 63 join one another, and may also be provided with a notch 72 for recessing the leading edge with respect to front face 63 of the extension for the purpose of shielding and/or protecting the leading edge from damage during this the scarfing process for reasons described in great detail below.

A fourth embodiment of lower pre-heat block assembly 9 is illustrated in FIGS. 9 and 10, in which a modular one-piece pre-heat block assembly is provided. The lower pre-heat block assembly 9 of FIG. 9 thus includes a lower block 38' having a substantially planar upper face 41, an opposed lower face 42, a pair of spaced and opposed end spaces 43 and 45 extending along the common edges of the upper and lower faces, a rear face 47 extending in the longitudinal direction of the block from end face 43 to end face 45 and being joined to the upper and lower faces thereof along their common edges, and an integral lower extension 39' formed as part of block 38'. Extension 39' has an upper face 58 which is recessed a pre-determined height from, and with respect to, upper face 41 of block 38'. Upper face 58 also lies substantially parallel to upper face 41. Extension 39' has a lower face 59 opposed to and spaced from upper face 58, and a pair of opposed and spaced end faces 60 and 62. Extension 39' also includes a front face 63 extending in the longitutinal/lengthwise direction thereof, between end faces 60 and 62, and adjoining upper face 58 along a leading edge 71 extending the length of the extension.

As with the embodiment of the lower pre-heat block assembly illustrated in FIGS. 7 and 8, block 38' is provided with an aligned and spaced series of openings 56' defined within front face 46 thereof and extending inwardly of the block into communication with bore 55. Each one of the openings 56' has a respective one of the inserts 57, described in greater detail above, received therein, such that the inserts define the respective ones of the gas discharge orifices 70 across the front face of lower block 38'.

As best shown in FIG. 10, in this embodiment of the lower pre-heat block assembly a bore 66 is once again defined within the extension 39' so that cooling water may be circulated therethrough, the bore having a water supply duct 67' formed at its respective ends adjacent end faces 43, 45, 60, and 62, respectively, extending toward and opening onto the rear face 47 of the block 38', one each of the two respective water supply ducts 67' being in communication with either water supply line 22 (FIG. 1) or water discharge line 23 (FIG. 1), respectively.

In both the two piece embodiments of lower pre-heat block assembly 9 illustrated in FIGS. 1 through 8, and in the one-piece embodiment illustrated in FIGS. 9 & 10, lower blocks 38, 38', and lower extensions 39, 39' will each be comprised of a metallic material, preferable bronze or copper, and more preferably of copper. Also, although an elongate slot 56 is shown as the gas discharge outlet in the embodiment of the invention shown in FIG. 2, a spaced series of circular openings 56 are shown as the gas discharge outlets in the embodiment of the invention illustrated in FIG. 4, and a spaced series of openings 56' with a respective one of the inserts 57 provided therein form the gas discharge outlets and orifices in the embodiments of the invention shown in FIGS. 7 and 9, it is anticipated that any desired type of gas discharge outlet and/or orifice combination could be provided, as desired. For example, and if so desired, each one of the respective openings 56 or 56' in FIGS. 4, 7, and 9 could be provided with a respective one of the fuel gas/oxygen nozzle assemblies 35 illustrated in FIG. 1. The respective constructions of the gas discharge outlets, and orifices illustrated in FIGS. 1 through 10, therefore, are intended to be illustrative, and not limiting.

OPERATION

The construction of lower pre-heat block assembly 9 of FIGS. 1 through 10 allows for the protection, i.e. the shielding, of the oxidizing gas flow formed by the oxygen passed through slot 16 (FIG. 1) during the scarfing process in fashion heretofore unknown in the art, and with results heretofore unattained by the known lower pre-heat block assemblies.

Figure 11:
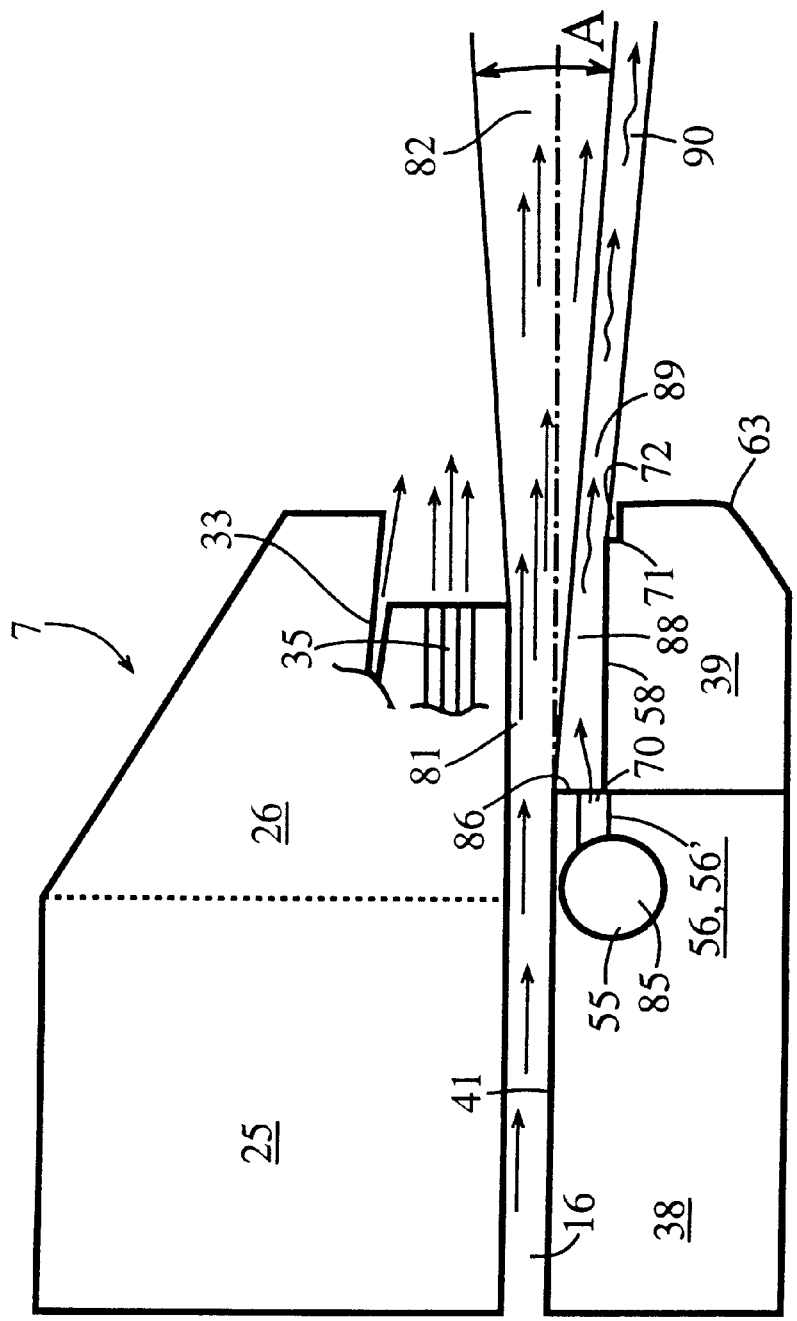
FIG. 11 is a partial schematic illustration of the lower pre-heat block of FIGS. 2–6 in use with a thermochemical scarfing apparatus, illustrating the formation of the pneumatic slot by the oxidizing gas flow as it is passed over the lower pre-heat block, and of the sheet-like fuel gas flow formed thereby which underlies and adjoins the oxidizing gas flow as it moves along a flow path leading toward the metal workpiece to be scarfed.

As known to those skilled in the art, as a compressed or pressurized gas, for example oxygen, is passed through an orifice, such as orifice 81 formed at the end of oxygen slot 16 in FIGS. 1 and 11, the gas will tend to expand as it progresses along the flow path through what is known as the included angle of expansion. Typically, the included angle of expansion will be approximately 14° as measured by the angle denoted by the reference character "A" in FIG. 11. The construction of the lower pre-heat block assembly of this invention, and in particular the extension thereof, takes advantage of this gas expansion to allow for the formation of a sheet-like fuel gas flow which underlies and adjoins, and thus shields, the oxygen gas flow as it passes along the flow path toward the metal workpiece to be scarfed.

As best shown in FIGS. 1 and 11, therefore, the oxygen gas flow passed through slot 16 and emitted from orifice 81 is formed into a sheet-like oxidizing gas flow 82 is extending along the flow path leading toward the metal workpiece to be scarfed. As shown in FIG. 11, the oxidizing gas flow tends to expand through the included angle of expansion A, which in turn creates a pneumatic chamber 88 defined by the exposed face 86 along front face 46 of lower block 38, the upper face 58 of the extension, and the oxidizing gas flow 82. Exposed face 86 is that portion of the front face 46 of the lower block left exposed once extension 39 is engaged upon and overlies the front face of the lower block. As a fuel gas 85 is emitted through gas discharge outlet 56, 56', and then through gas discharge orifice 70, the oxidizing gas flow acts to pneumatically compress and squeeze the fuel gas such that it is substantially and uniformly distributed across the exposed face along the longitudinal length, i.e., across the width of the oxidizing gas flow within the pneumatic chamber 88.

Extension 39, and more particularly upper face 58 and leading edge 71 thereof, are constructed such that they extend in the downstream direction of the flow path, but yet terminate before the point at which the oxidizing gas flow intersects the leading edge 71 of the upper face, such that the oxidizing gas stream 82 and the leading edge 71 form a pneumatic slot 89 in communication with chamber 88, which allows the now uniformly distributed fuel gas, which has been protected within chamber 88 from aspiration with the ambient air, to pass through the slot as a sheet-like fuel gas flow 90 which underlies and adjoins the oxidizing gas flow, and flows with the oxidizing gas flow along the flow path toward the metal workpiece to be scarfed, thus quickly, efficiently, and economically shielding the oxidizing gas flow without the need for precisely machining a gas discharge slot and/or baffle/mixing chambers within the extension.

It is anticipated that with the known types of lower pre-heat blocks and scarfing machines manufactured by ESAB Welding and Cutting Products of Florence, S.C., for example, in which upper face 58 lies approximately one quarter of an inch below upper face 41, that the upper face 58 of extension 39, will extend away from the front face 46 of the lower block 38, 38', respectively, through a length in the range of from five eighths of an inch to approximately one and one quarter inch in length. This relationship, described differently, would be that where the upper face 58 of the extension 39 is spaced below the upper face 41 of the lower block 38 a predetermined distance, i.e. the distance which is offset between the two respective upper faces, the upper face of the extension will extend forwardly from the front face of the lower block a distance of between 2½ to 5 times the predetermined height.

No matter how sized, however, it is anticipated that upper face 58 will not extend so far in the direction of the oxidizing gas flow along the flow path such that it will intersect the oxidizing gas flow. If leading edge 71 intersected the oxidizing gas flow, pneumatic slot 89 will not be formed, and this will allow ambient air to aspirate with the oxidizing gas flow and to create the undesirable effect of inducing turbulence, and thus ripples in the oxidizing gas flow.

The length of upper face 58 extending in the direction of the oxidizing gas flow path may also be expressed with respect to the angle of expansion A, as this will define the hypotenuse of a triangle formed with the exposed face 86 of lower block 38, and upper face 58 of the extension. If, for example, the included angle of expansion A in FIG. 11 is approximately 14°, then using known geometric relationships, the ratio of the height of the exposed face 86 of block 38 with respect to the length of upper face 58 of extension 39 will be equal to the tangent of the angle of expansion in order for the two sides of the triangle to intersect the hypotenuse, and thus the oxidizing gas flow. Thus, it is anticipated that the ratio of the height of the exposed face 86 with respect to the length of the upper face 58 will be substantially equal to, but less than, the tangent of the angle of expansion A such that sufficient space will be allowed between the oxidizing gas flow 82 and leading edge 71 to form pneumatic slot 89, in communication with pneumatic chamber 88, and to allow the formation of sheet-like fuel gas flow 90 as shown in FIGS. 1 and 11. In one specific example, the angle of expansion A is approximately 14°, the height of the exposed face 86 is approximately ¼ inch, and the length of the upper face 58 is approximately 1 inch.

A method of forming the sheet-like fuel gas flow 90 practiced by lower pre-heat block assembly 9 thus includes the steps of passing the oxidizing gas flow 82 over the upper face 41 of the lower block 38, 38' and over the upper face 58,58' of the extension 39, 39', respectively, the oxidizing gas flow being spaced from (above) and with respect to the leading edge 71 of the extension; discharging a fuel gas 85 from a fuel gas discharge outlet 56 positioned in a front face 46 of the block assembly adjoining the upper face 41, and forming a second sheet-like fuel gas flow 90 which underlies and adjoins the sheet-like oxidizing gas such that the fuel gas is pneumatically compressed by and between the oxidizing gas flow and the upper face 58,58' to uniformly distribute the fuel gas along the length of the lower pre-heat block assembly.

The method also includes the steps of forming a pneumatic slot 89 between the sheet-like oxidizing gas flow and the leading edge 71 of the upper face 58,58' of the extension, the slot extending across substantially the full longitudinal extent of the upper face 58,58', such that the fuel gas is pneumatically compressed or squeezed through the slot and formed into the sheet-like fuel gas flow 90 by the sheet-like oxidizing gas flow to uniformly distribute the fuel gas flow under the oxidizing gas flow as the sheet-like fuel gas flow passes through the pneumatic slot. As a result of this process, the sheet-like fuel gas flow underlies and adjoins the oxidizing gas flow 82 to shield the oxidizing gas flow from aspirating with ambient air in order to attain a smoother scarfed surface on the steel slab S (FIG. 1) being passed through scarfing apparatus 5.

Also, as a part of the process of forming the sheet-like fuel gas flow, pneumatic chamber 88 (FIG. 11) is formed by and between the oxidizing gas flow 82, the exposed face 86 of the lower block, and the upper face 58, 58' of the extension when the fuel gas is emitted from the fuel gas discharge outlet 56 defined within the front face of the lower block. The pneumatic slot 89 is formed to be in communication with the pneumatic chamber. The upper boundary layer of oxidizing gas flow 82 will be shielded by the oxygen and the oxygen/gas flows emitted by upper pre-heat block assembly 7 in the fashion described in the several patents to Showalter et al., referenced above.

While preferred embodiments of the invention have been disclosed in the foregoing specification, it is understood by those skilled in the art that variations and modifications thereof can be made without departing from the spirit and scope of the invention, as set forth in the following claims. In addition, the corresponding structures, materials, acts, and equivalents of all means or step plus function elements in the claims, below, are intended to include any structure, materials, or acts for performing the described or claimed functions in combination with the other claimed elements, as specifically claimed herein.

I claim:

1. A method of shielding an oxidizing gas flow of a thermochemical scarfing procedure comprising the steps of:

passing a sheet-like oxidizing gas flow across a first upper face of a block assembly, while discharging a fuel gas from a fuel gas outlet positioned in a front face of the block assembly adjoining said upper face and so as to form a second sheet-like fuel gas flow which underlies said sheet-like oxidizing gas flow, while causing the sheet-like oxidizing gas flow to expand as it moves across a second upper face which extends forwardly from said front face so as to compress the second sheet-like fuel gas flow between the second upper face and the expanding sheet-like oxidizing gas flow to thereby substantially uniformly distribute the second sheet-like fuel gas flow under the sheet-like oxidizing gas flow.

2. The method of claim 1, further comprising the steps of forming a pneumatic slot between said sheet-like oxidizing gas flow and said second upper face, said slot extending longitudinally across substantially the full longitudinal extent of said second upper face, the fuel gas being compressed as it passes through said slot to form said second sheet-like fuel gas flow.

3. The method of claim 1, wherein the second upper face is formed on an extension which is fixed to said front face of the block assembly so as to partially overlie said fuel gas outlet.

4. The method as defined in claim 1, wherein the sheet-like oxidizing gas flow expands at a predetermined angle, and wherein the ratio of the height of the front face of the block assembly with respect to the length of the second upper face is substantially equal to the tangent of said predetermined angle.

5. A method of shielding an oxidizing gas flow during a thermochemical scarfing procedure comprising the steps of passing a sheet-like oxidizing gas flow across a first upper face of a block assembly and so that the gas flow passes across a forward edge of the first upper face and then is caused to expand so as to define an angle of expansion, discharging a fuel gas from a fuel gas outlet positioned in a front face of the block assembly which depends downwardly from the forward edge of the first upper face and so as to form a sheet-like fuel gas flow which underlies said sheetlike oxidizing gas flow, while compressing the sheet-like fuel gas flow between a second upper face of the block assembly which extends forwardly from said front face and substantially parallel to said first upper face, and the expanding sheet-like oxidizing gas flow, and wherein the second upper face extends forwardly to a leading edge which is short of the point at which the expanding sheet-like oxidizing gas flow intersects a plane defined by the second upper face, and such that the expanding sheet-like oxidizing gas flow and the leading edge form a pneumatic slot which serves to compress and substantially uniformly distribute the sheet-like fuel gas flow under the sheet-like oxidizing gas flow.

6. The method as defined in claim 5 wherein the front face of the block assembly defines a height which extends between the forward edge of the first upper face and the second upper face, and the second upper face extends forwardly from the front face a distance of between about 2% to 5 times said height.

7. The method as defined in claim 5 wherein the front face of the block assembly defines a height which extends between the forward edge of the first upper face and the second upper face, and wherein the ratio of the height of the front face with respect to the length of the second upper face is substantially equal to or less than the tangent of said angle of expansion.

* * * * *

UNITED STATES PATENT AND TRADEMARK OFFICE
CERTIFICATE OF CORRECTION

PATENT NO.   : 6,440,229 B1
DATED        : August 27, 2002
INVENTOR(S)  : Engel

It is certified that error appears in the above-identified patent and that said Letters Patent is hereby corrected as shown below:

<u>Column 16,</u>
Line 33, "sheetlike" should read -- sheet-like --;
Line 53, "2%" should read -- 2 1/2 --.

Signed and Sealed this

Seventh Day of January, 2003

JAMES E. ROGAN
*Director of the United States Patent and Trademark Office*